2,952,688
SYNTHESIS OF PYRROLIDINE

Granville Bruce Kline, Greenwood, and Edwin R. Shepard, Indianapolis, Ind., assignors to Eli Lilly and Company, Indianapolis, Ind., a corporation of Indiana No Drawing. Filed Jan. 20, 1958, Ser. No. 709,794

4 Claims. (Cl. 260—313)

This invention relates to a novel method of preparing pyrrolidine.

It is an object of this invention to provide a method of preparing pyrrolidine in high yield from readily available starting materials by a commercially practicable process.

In fulfillment of the above and other objects, this invention provides a method of synthesizing pyrrolidine which comprises heating a mixture of putrescine (tetramethylenediamine) and a supported nickel catalyst to a temperature sufficient to effect the liberation of ammonia and the cyclization of the putrescine to pyrrolidine, such temperature being in the range of about 100° C. to about 160° C.

As set forth hereinafter, the process of this invention can be carried out in a batch-wise or in a semi-continuous manner.

Although the pyrrolidine produced by the reaction is of sufficient purity for most purposes, it is contaminated by a minor amount of pyrroline (dihydropyrrole), the amount generally not exceeding a few percent. The amount of pyrroline formed appears to be inversely dependent upon the amount of catalyst employed in the reaction, and directly dependent upon the length of time the catalyst is used. In the event a pure pyrrolidine is desired, it can readily be obtained by subjecting the pyrroline-containing product to fractional distillation. Alternatively, the mixture of pyrroline and pyrrolidine can be catalytically hydrogenated to provide a product consisting solely of pyrrolidine.

The preparation of pyrrolidine by the method of this invention in a batch process, conveniently is carried out as follows: Putrescine and a supported nickel catalyst are placed in a reaction vessel and the mixture is heated to a temperature such that ammonia is evolved. The heating is continued until the evolution of ammonia has substantially ceased, and the reaction mixture is then distilled to recover the pyrrolidine. The temperature of the reaction mixture at which ammonia is evolved and pyrrolidine is produced in such process, ranges from about 100° C. at the beginning of the reaction period to about 160° C. at its termination. Since the ammonia which escapes from the reaction mixture tends to carry with it some entrained pyrrolidine, the apparatus employed for the reaction should be equipped with a condensing means to strip the pyrrolidine from the ammonia. Desirably, the condensing means is so arranged and the heating such that the pyrrolidine produced is distilled from the reaction mixture as it is formed, and thus is collected as the reaction proceeds.

In carrying out the method of this invention in a semicontinuous manner, the putrescine is added to the heated reaction vessel at the same rate at which the pyrrolidine distills therefrom. In this process the ratio of pyrroline to pyrrolidine appears to increase the longer the process is carried out. In addition, an amount of high molecular weight, tarry residue slowly forms in the reaction vessel as more and more putrescine is converted to pyrrolidine. Because of the foregoing side reactions, the process should be interrupted from time to time to permit the cleansing of the reaction vessel and the renewal of the catalyst.

The supported nickel catalyst employed can be any of the customarily employed catalysts. For reason of ready availability, nickel-kieselguhr catalyst is preferred. Desirably, although not necessarily, the nickel content of the catalyst is in the neighborhood of about fifty percent by weight of the catalyst mixture. However, there is nothing critical about the nickel content, and supported catalysts with greater or lesser nickel content are also effectively operative.

The amount of catalyst employed per unit of putrescine is not critical, and widely varied ratios of catalyst to putrescine can be employed. In general, it can be said that a high ratio of catalyst to diamine, for example 25 g. of catalyst for each 100 ml. of diamine, will yield a product containing a minimum amount of pyrroline by-product. If a lesser amount of catalyst, for example, 5 g. per 100 ml. of diamine is used, the amount of pyrroline present increases although it is still small compared to the amount of pyrrolidine produced, the maximum amount of pyrroline generally being less than about five percent.

This invention is further illustrated by the following specific examples:

Example 1

110 ml. of putrescine and 16 g. of 55 percent nickel-kieselguhr were placed in a reaction vessel equipped with a condenser, and the mixture was heated to about 120° C. at which temperature ammonia was copiously produced. The pyrrolidine which distilled was collected. At the end of about three hours, the temperature of the reaction mixture had risen to about 160° C. and the distillation of pyrrolidine had nearly ceased. 73 ml. of pyrrolidine were obtained. After redistillation, the pyrrolidine had a refractive index as follows: $n_D^{25}=1.443–6$. The yield of pyrrolidine based on the amount of putrescine used was about 87 percent.

Example 2

100 ml. of putrescine and 5 g. of 55 percent nickel-kieselguhr were heated to about 120° C. The pyrrolidine formed in the reaction mixture distilled from the mixture and was condensed by means of a water-cooled condenser attached to the top of a short reflux tube. Putrescine was added dropwise to the reaction mixture at the same rate as the pyrrolidine distilled to maintain the initial volume of 100 ml. A total of about 300 ml. of putrescine was added to the reaction vessel over a period of about ten hours, yielding about 250 ml. of pyrrolidine. The distillate was refluxed for about one hour to remove traces of ammonia. The refractive index of the refluxed product was as follows: $n_D^{25}=1.463$.

The distillate was hydrogenated over 5 percent palladium on carbon under a hydrogen pressure of about 70 atmospheres for two and one-half hours in a high pressure hydrogenation apparatus, thus converting any pyrroline present in the mixture to pyrrolidine. The refractive index of the hydrogenated material was as follows: $n_D^{25}=1.446$.

We claim:

1. The method of preparing pyrrolidine which comprises heating a mixture of putrescine and a supported nickel catalyst to a temperature sufficient to effect the liberation of ammonia, and recovering the pyrrolidine that is produced.

2. The method of preparing pyrrolidine which comprises heating a mixture of putrescine and a supported nickel catalyst at a temperature between about 100° C.

and about 160° C. whereby ammonia is liberated, and pyrrolidine is produced.

3. The method of claim 2 in which the supported nickel catalyst is nickel supported on kieselguhr.

4. The method of preparing pyrrolidine which comprises heating a mixture of putrescine and a nickel-kieselguhr catalyst containing about 50 percent by weight nickel to a temperature at which ammonia is produced and pyrrolidine is distilled from the reaction mixture, and adding putrescine to the reaction mixture at such a rate that the volume of said mixture is maintained substantially constant.

References Cited in the file of this patent

UNITED STATES PATENTS 2,285,413 Coleman _____ June 9, 1942
2,790,804 Silverstone _____ Apr. 30, 1957

OTHER REFERENCES

Ladenburg, Berichte, vol. 19, pp. 780–1 (1886).
Organic Chemistry, Schmidt, 7th ed., p. 264, Oliver and Boyd (London) (1955).
Paden et al.: Jour. Am. Chem. Soc., vol. 58, p. 2487 (1936).